Figure 1:
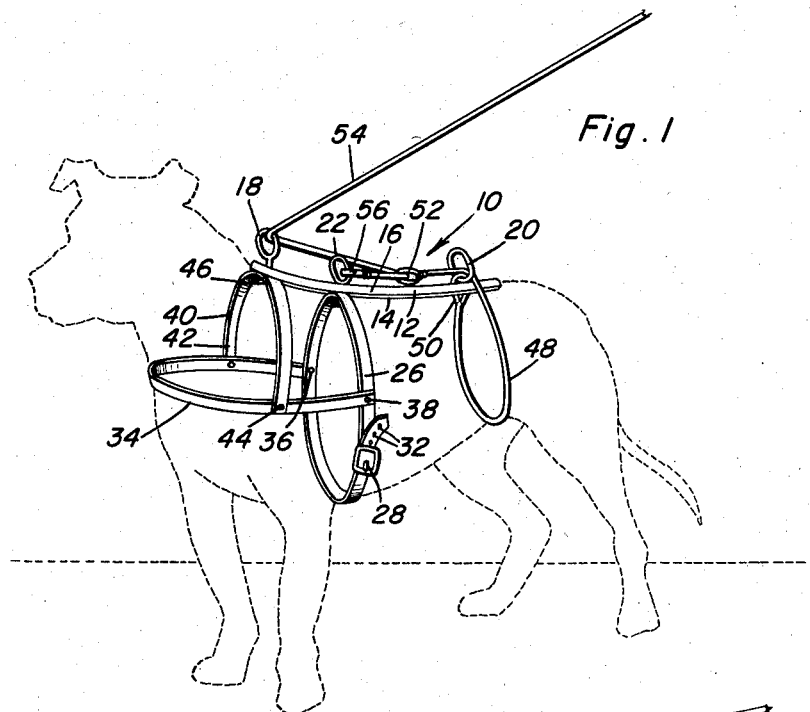

March 11, 1958 J. O. BUCKLE ET AL 2,826,172
ANIMAL ACTUATED RESTRAINING DOG HARNESS
Filed June 26, 1956

Jack O. Buckle
Robert E. May
INVENTORS.

BY *Clarence A. O'Brien*
*and Harvey B. Jacobson*
Attorneys

# United States Patent Office 2,826,172
Patented Mar. 11, 1958

2,826,172

ANIMAL ACTUATED RESTRAINING DOG HARNESS

Jack O. Buckle, Hollywood, Fla., and Robert E. May, Greenvale, N. Y.

Application June 26, 1956, Serial No. 593,972

4 Claims. (Cl. 119—96)

This invention relates to an animal restraining device and more particularly to a harness adapted to be utilized in the handling of dogs and other animals.

The primary object of the present invention resides in the provision of a dog harness which is adapted to enable even a comparatively large dog to be easily restrained from undesired pulling or tugging on a leash.

Many dogs, particularly those of the working breeds such as boxers, German shepherds, Great Danes and others attain a comparatively large size when still very young. Because such young dogs cannot be adequately trained when still young without the possibility of breaking their spirit or otherwise rendering them unsuitable for the purposes desired, it is often necessary to utilize a harness when training the dog to the leash since many times the dogs refuse to respond to initial training with a collar. Furthermore, a harness is often a desirable and ornamental device for attaching a leash or other lead to the dog. However, because a harness generally embraces the chest and body portions of the dog, when the dog desires to move or is otherwise attracted to a given direction, he is enabled to pull upon the harness and leash with considerable power. This is often undesirable inasmuch as it then requires considerable strength to restrain the large and active dog. Moreover, when training young animals, the tendency to pull on a harness will cause the shoulders of the animal to thrust forward. Inasmuch as a shoulder that is well laid back enables the dog to stand and move with a considerable arch to its chest and neck, the appearance of the animal can be permanently distorted by the forward thrust to the shoulders caused by pulling at a harness. It is therefore another important object of the present invention to provide a harness for a dog which incorporates a means for restraining the dog from pulling with great force upon the harness.

An additional object of the present invention resides in the provision of an animal restraining device which is so arranged as to embrace and choke the loins of the animal rather than the neck thereof so as to prevent the undesirable pressure on the windpipe of the animal which may cause unnecessary suffering and perhaps permanent injury to the animal.

A further and important feature of the invention resides in the provision of a dog harness which will enable the dog to be easily restrained from unwanted movement due to the fact that the very movement of the dog will tend to tighten the loin choke.

Still further objects and features of this invention reside in the provision of a dog harness that is simple in construction, easy to properly position on a dog, which can be made in any number of suitable sizes for various breeds and sizes of dogs, yet which is adjustable to a considerable degree, and which is inexpensive to manufacture while being attractive in appearance.

Figure 2:
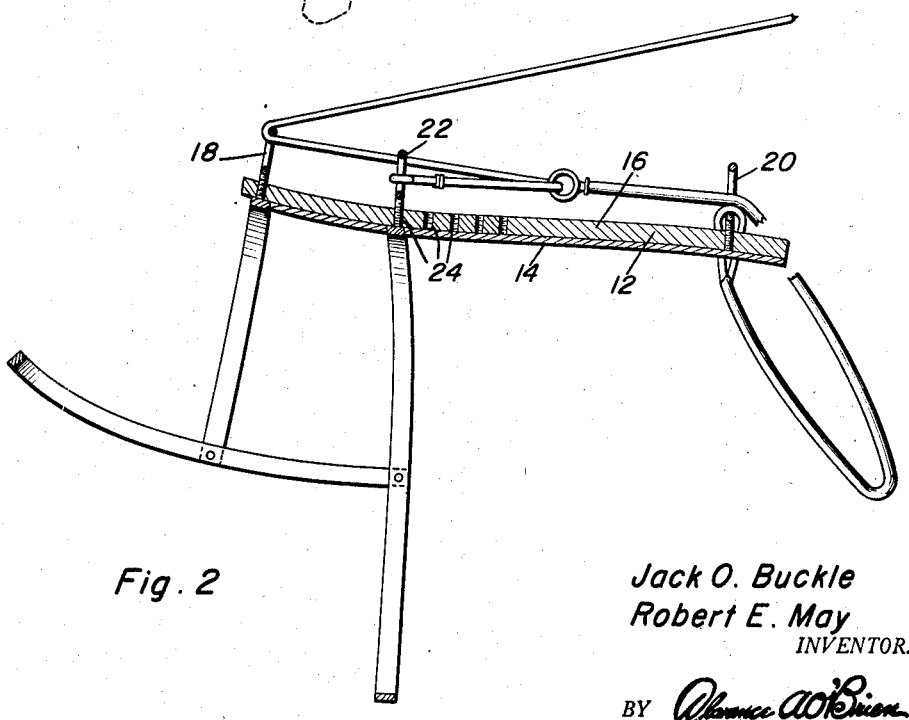

These, together with the various ancillary objects and features of the invention will become apparent as the following description proceeds, are attained by this animal restraining device, a preferred embodiment of which has been illustrated in the accompanying drawing, by way of example only, wherein:

Figure 1 is a perspective view of the dog harness comprising the present invention; and Figure 2 is an enlarged sectional detail view of the dog harness.

With reference to the accompanying drawing wherein like reference numerals designate similar parts throughout the various views, reference numeral 10 generally designates the dog harness comprising the present invention. This dog harness includes a back strap 12 which may be made in two pieces including a length of leather 14 or the like having a metal bar 16 affixed thereto by any suitable means such as bonding by an adhesive or by riveting. Threadedly detachably secured to the metal bar 16 is a front eyelet 18, a rear eyelet 20 and an intermediate eyelet 22 which is adjustably secured in one of a plurality of threaded apertures 24 in the bar 16 so that the position of the intermediate eyelet 22 may be readily adjusted to compensate for the relative proportions of the dog on which the harness is to be utilized.

Affixed to the back strap 12 by any suitable means is a body strap 26 which may include a buckle 28 adapted to cooperate with the end 30 which is suitably apertured as at 32 for adjustably tightening the body strap 26 about the dog. A chest strap 34 is provided and has its ends as at 36 and 38 riveted or otherwise secured to the body strap 26 in a manner so that the chest strap 34 can embrace the chest of the dog. A neck strap 40 adapted to overlie the neck of the dog or the front portion of the body thereof has its end as at 42 and 44 riveted or otherwise secured to the chest strap 34 and has an intermediate portion as at 46 secured as by riveting or the like to the back strap 12.

A choke strap 48 which is adapted to embrace the loin of the dog is secured at one end to the back strap 12 as by a loop 50 engaging the eyelet 20 which is affixed to the back strap 12. The other end of the loin choke strap 48 is provided with a loop as at 52 through which a leash 54 extends. In this manner, the choke strap 48 can slidably move within the eyelet 20 while the leash can slidably move within the loop 52. A clip or other fastener 56 is provided on the end of the leash 54 and is secured to the eyelet 22 with a portion of the leash 54 slidably passing through the eyelet 18. In this manner, should the dog pull, it is merely necessary for the master of the dog to hold the leash. Further pulling movement of the dog will cause the choke strap 46 to tighten about the loin of the dog rendering the dog uncomfortable and unable to further strain against the harness.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A dog harness comprising a back strap adapted to overlie the back of a dog and having a plurality of eyelets thereon including a rear eyelet adjacent the rear end of said back strap, strap means for embracing the neck, chest and body of a dog secured to said back strap, a loin engaging choke strap having one end secured to said back strap with the other end of said choke strap slidably passing through said rear eyelet, and a leash extending through at least one of said eyelets engaging said other end of said choke strap.

2. A dog harness comprising a back strap adapted to overlie the back of a dog and having a plurality of eyelets thereon including front, intermediate, and rear eyelets, strap means for embracing the neck, chest and body of a dog secured to said back strap, a loin engaging choke strap having one end secured to said back strap, said back strap slidably extending through said rear eyelet and having a loop at the other end thereof, a leash secured to said intermediate eyelet and slidably extending through said loop and said front eyelet.

3. A dog harness comprising a back strap adapted to overlie the back of a dog and having a plurality of eyelets thereon including a rear eyelet adjacent the rear end of said back strap, strap means for embracing the neck, chest and body of a dog secured to said back strap, a loin engaging choke strap having one end secured to said back strap with the other end of said choke strap slidably passing through said rear eyelet, and a leash extending through at least one of said eyelets engaging said other end of said choke strap, said strap means including a body strap having means for adjustably tightening said body strap about the body of a dog, said body strap being affixed to said back strap, a chest strap of U-shape having the ends thereof affixed to said body strap, and a neck strap having the ends thereof affixed to said chest strap with an intermediate portion of said neck strap being affixed to said back strap.

4. A dog harness comprising a back strap adapted to overlie the back of a dog and having a plurality of eyelets thereon including front, intermediate, and rear eyelets, strap means for embracing the neck, chest and body of a dog secured to said back strap, a loin engaging choke strap having one end secured to said back strap, said back strap slidably extending through said rear eyelet and having a loop at the other end thereof, a leash secured to said intermediate eyelet and slidably extending through said loop and said front eyelet, said strap means including a body strap having means for adjustably tightening said body strap about the body of a dog, said body strap being affixed to said back strap, a chest strap of U-shape having the ends thereof affixed to said body strap, and a neck strap having the ends thereof affixed to said chest strap with an intermediate portion of said neck strap being affixed to said back strap.

References Cited in the file of this patent

UNITED STATES PATENTS

| | | |
|---|---|---|
| D. 135,752 | Curtis | June 1, 1943 |
| 1,614,083 | Plantico | Jan. 11, 1927 |
| 1,938,183 | Keen | Dec. 5, 1933 |